United States Patent [19]
Monteith

[11] 3,804,996
[45] Apr. 16, 1974

[54] COLLECTOR INSULATING BOOT

[75] Inventor: William Monteith, New Carrollton, Md.

[73] Assignees: Alan Goodman, Narberth; William Korb, Churchville; Louis Godshalk, Radnor, all of, Pa. ; part interest to each

[22] Filed: Aug. 3, 1972

[21] Appl. No.: 277,707

[52] U.S. Cl. .................................. 191/1, 191/49
[51] Int. Cl. ............................................. B60l 5/38
[58] Field of Search .............. 191/1, 45, 49, 46, 47, 191/48, 30, 29; 339/36; 174/138 R

[56] References Cited
UNITED STATES PATENTS

| | | | |
|---|---|---|---|
| 3,528,049 | 9/1970 | Orr | 174/138 R |
| 899,593 | 9/1908 | Hayes | 191/49 |
| 2,740,001 | 3/1956 | Vergilio | 174/138 R |
| 3,484,541 | 12/1969 | Campbell | 174/138 R |

Primary Examiner—M. Henson Wood, Jr.
Assistant Examiner—D. W. Keen
Attorney, Agent, or Firm—Seidel, Gonda & Goldhammer

[57] ABSTRACT

A collector insulating boot designed to fit on a vehicle collector shoe to isolate a faulty current collect circuit from a power rail and for use with electrically driven vehicles. The boot is readily detachable from the collector shoe.

7 Claims, 4 Drawing Figures

PATENTED APR 16 1974 3,804,996

COLLECTOR INSULATING BOOT

This invention is directed to an insulating boot, and more particularly, to a collector insulating boot designed to fit on a vehicle such as a rapid transit vehicle current collector shoe. The boot is designed to isolate a faulty current collector circuit from the power contact rail. At the same time, the boot permits the vehicle to continue in operation until such time that the problem can be corrected by maintenance personnel.

Common electrical failures occur in the traction motor circuit as well as the collector shoe supporting frame. The latter is more commonly termed a "shoe-beam short." The collector insulating boot of the present invention is rugged, lightweight, and fire-retardant with the ability to withstand the friction and resistance encountered by the sliding action of the shoe as the vehicle is in motion.

It is an object of the present invention to provide a novel collector insulating boot which may be rapidly applied when needed to isolate a faulty current collector circuit from the power contact rail.

It is another object of the present invention to provide a collector insulating boot which eliminates disadvantages inherent in present practices when a fault occurs.

Other objects will appear hereinafter.

The present invention may be embodied in other specific forms without departing from the spirit or essential attributes thereof and, accordingly, reference should be made to the appended claims, rather than to the foregoing specification as indicating the scope of the invention.

Figure 1:
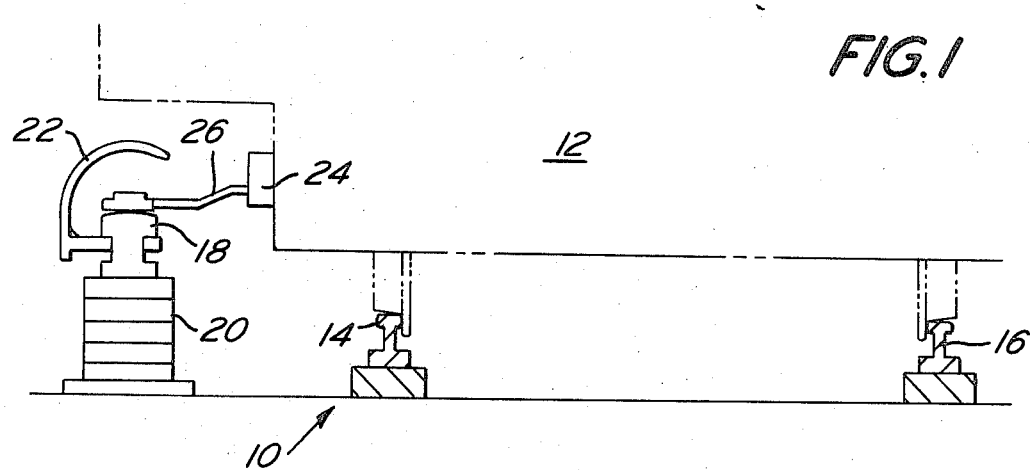
FIG. 1 is a schematic view of a vehicle riding on running rails while being coupled by means of a collector shoe to a power rail.

Referring to the drawing in general, there is shown in FIG. 1 a rapid transit vehicle system designated generally as 10. The system 10 includes an electrically driven vehicle 12 having wheels riding on running rails 14 and 16. The vehicle 12 is coupled to a power rail or third rail 18 which in turn is mounted on an insulation support 20.

The power rail 18 is protected from the elements by means of a guard 22 mounted on support 20. A plurality of collector shoe assemblies 24 on the vehicle 12 are coupled to a discrete collector circuit, not shown, on the vehicle 12 and to the power rail 18 by means of a discrete collector shoe 26. Each shoe 26 is pivotably connected to vehicle 12 and is spring or gravity biased into contact with rail 18.

Figure 2:
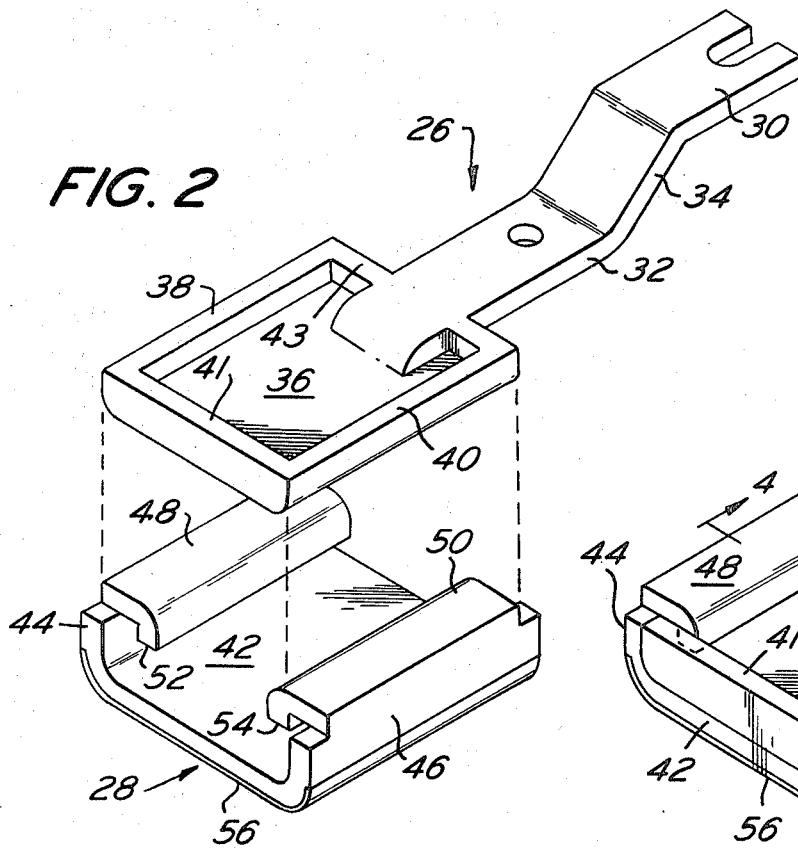
FIG. 2 is an exploded view of a collector shoe and boot in accordance with the present invention.
Figure 3:
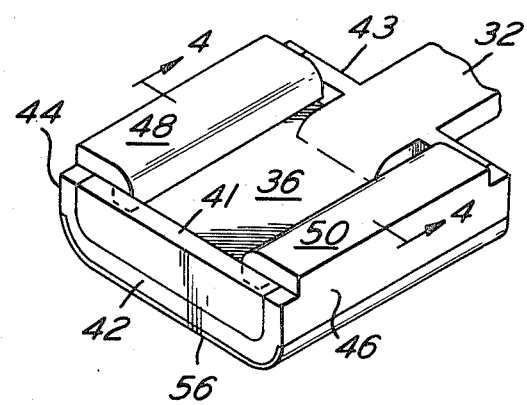
FIG. 3 is a partial perspective view of a collector shoe with the boot attached thereto.
Figure 4:
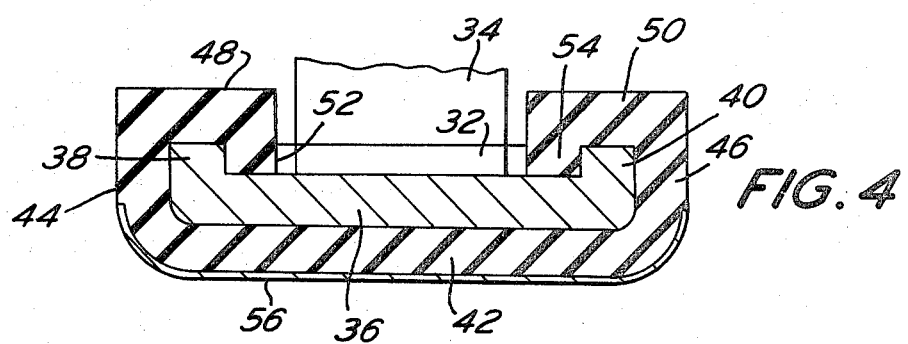
FIG. 4 is a sectional view taken along the line 4—4 in FIG. 3.

The shoe 26 which is generally made of a material such as cast iron is adapted to be provided with a collector insulating boot designated generally as 28. As shown more clearly in FIG. 2, the shoe 26 includes an upper portion 30 adapted to be removably coupled to the collector shoe assembly 24 and a lower portion 32. The upper and lower portions 30 and 32 are connected together by the angled portion 34.

The lower portion 32 of the collector shoe 26 terminates in a wide portion 36 which contacts rail 18 with its lower surface in the absence of boot 28. The wide portion 36 is provided with a rim means on its upper surface. The rim means is defined by the parallel side rims 38 and 40 and the end rims 41, 43.

The collector insulating boot 28 is C-shaped in cross section and includes a body portion 42 provided with legs 46 and 44. The legs 44 and 46 are notched at each end and terminate in horizontally disposed flanges 48 and 50 which extend toward one another. Flange 48 terminates in a downwardly extending shoulder 52. Flange 50 terminates in a downwardly extending shoulder 54. The shoulders 52, 54 are in abutting contact with the juxtaposed rims 38, 40 so as to prevent separation between the shoe 26 and boot 28 due to torque of an amount normally encountered when in use.

The body and flanges of the boot 28 are preferably made from a non-metallic, resilient material having high impact strength, high dielectric constant, and being fire-retardant. The body portion of the boot may be made from a wide variety of polymeric plastics including polystyrene, polyvinylchloride, Lexan (trademark), etc. The body portion 42 of the boot 28 is provided with an insert in the form of a contact surface 56. The contact surface 56 is adapted to slide on the power rail 18 when the boot 28 is in use. The contact surface 56 is preferably constructed of thin stainless steel or other similar longwearing material having the same wear characteristics of cast iron. If contact surface 56 were not provided, the boot 28 would wear and coat the rail 18 with a non-conductive coating which could create havoc with the system.

The insulating boot 28 is designed so that it may snap into place while being rigid enough to remain in place during vibration, bounce, or high speed operation. The boot 26 is intended for use in emergency or temporary service rather than being a permanent fixation. The boot 28 is not intended to replace the current collector assembly. The boot 28 may be applied by inserting one side flange of the boot 28 in place and then snapping the other spring-tension flange over the top of the rim on the opposite side of the shoe 26.

When a fault develops in the current collector circuit 24 on a vehicle 12 without the present invention, it has been conventional to resolve the problem in the following manner. In response to a signal on the control panel, the conductor stops the vehicle. Emergency trip switches located along the system right of way are tripped so as to remove power from the rail 18. Maintenance crew are dispatched to the scene. If the vehicle 12 is in a position wherein the collector shoe 26 is inaccessible, a wooden paddle with a long handle is slid between the collector shoe 26 and the contact power rail. Power is then restored to the rail 18. The vehicle 12 is then slowly moved to a clear area wherein a maintenance man walks alongside the vehicle 12 and maintains the wooden paddle between the shoe 26 and the rail 18. Thereafter, the collector shoe 26 is tied in an inoperable position or the failure, if visible, is corrected.

If the failure is corrected, the vehicle 12 is then permitted to proceed. If the failure is not immediately capable of being corrected, the shoe 26 remains in its inoperable position and the vehicle 12 proceeds to the end of its scheduled run using power transmitted by other non-faulty shoe assemblies, at which time the vehicle 12 is removed from service for repair.

In accordance with the present invention, when a fault occurs, the power from the power rail 18 should be removed, but it is not necessary. An attendant on the vehicle lifts the collector shoe 26 off the contact rail 18 with a wooden paddle. The insulating boot 28 is then snapped over the collector shoe 26. The collector shoe 26 is permitted to drop onto the contact rail 18 for normal operation. The attendant may then proceed with normal service.

Time is a considerable advantage flowing from the present invention in that maintenance personnel and power removal is not necessary. The vehicle attendant may quickly perform the necessary procedures. The entire procedure may be accomplished in a matter of minutes, thereby reducing the system operational down time. Heat creating friction between the insulating boot 28 and the contact rail 18 will not damage the insulating boot 28 while in service. The present invention contemplates each vehicle carrying one or more of the insulating boots 28 for each shoe 26 for use during an emergency.

Thus, it will be seen that the collector insulating boot 28 of the present invention has substantial advantages over the procedures utilized heretofore. The boot 28 may be snapped on or slipped on the shoe 26 when a need occurs to isolate a faulty current collector circuit from the power contact rail 18 while at the same time permitting the vehicle 12 to continue in operation until such time that the problem can be corrected by maintenance personnel. The boot 28 may be provided with a configuration so that it can be adapted to any one of a wide variety of collector shoes presently in service.

The present invention may be embodied in other specific forms without departing from the spirit or essential attributes thereof and, accordingly, reference should be made to the appended claims, rather than to the foregoing specification as indicating the scope of the invention.

I claim:

1. A collector boot for use on a collector shoe comprising a body of electrically insulating, resilient, non-metallic material, means on the body for retaining the body on a collector shoe, and said body having a hard contact surface adapted to slide on a power rail while insulating a shoe from a power rail.

2. A collector boot in accordance with claim 1 wherein said body is generally C-shaped in cross section, said body having flanges extending toward one another, each flange having a shoulder for engaging a rim on a shoe.

3. A collector boot in accordance with claim 2 wherein said flanges are shorter than the length of said body.

4. A collector boot in accordance with claim 1 wherein said boot is made from a polymeric plastic material, and said hard contact surface being metal.

5. A collector boot in accordance with claim 1 including a collector shoe having one end adapted for connection to an electrically operated vehicle and an opposite end adapted to contact a power rail, said boot being removably connected to said opposite end of said shoe.

6. Apparatus in accordance with claim 5 wherein said hard contact surface is metal.

7. A collector boot in accordance with claim 1 wherein said hard contact surface is thinner than the thickness of said body and extends across a major face of said body.

* * * * *